United States Patent
Sangameshwara et al.

(10) Patent No.: US 12,375,576 B2
(45) Date of Patent: Jul. 29, 2025

(54) METHODS AND SYSTEMS TO PUSH NOTIFICATION MESSAGES IN SEAL NOTIFICATION MANAGEMENT SERVICE

(71) Applicant: Samsung Electronics Co., Ltd., Gyeonggi-do (KR)

(72) Inventors: Vijay Sangameshwara, Bangalore (IN); Arunprasath Ramamoorthy, Bangalore (IN); Basavaraj Jayawant Pattan, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/660,855

(22) Filed: May 10, 2024

(65) Prior Publication Data
US 2024/0380824 A1   Nov. 14, 2024

(30) Foreign Application Priority Data

May 12, 2023 (IN) .............................. 202341033668
May 12, 2023 (IN) .............................. 202341033729
Apr. 25, 2024 (IN) .............................. 202341033668

(51) Int. Cl.
*H04L 67/55*   (2022.01)
*H04L 67/02*   (2022.01)

(52) U.S. Cl.
CPC ............. *H04L 67/55* (2022.05); *H04L 67/02* (2013.01)

(58) Field of Classification Search
CPC ............................. H04L 67/55; H04L 67/02
See application file for complete search history.

(56) References Cited

U.S. PATENT DOCUMENTS

2022/0109964 A1* 4/2022 Pattan ..................... H04W 4/08

FOREIGN PATENT DOCUMENTS

| CN | 114616844 A | * | 6/2022 | ......... H04L 63/0442 |
| WO | WO-2024036312 A1 | * | 2/2024 | ........... H04L 67/148 |
| WO | WO-2024097339 A1 | * | 5/2024 | ............ H04W 24/10 |

OTHER PUBLICATIONS

3GPP TS 25.542 V0.2.0, (Apr. 2023), 10 pp (Year: 2023).*
3GPP TS 25.542 V0.2.0, (Apr. 2023), 10 pp.
Samsung, AT&T, "Seal Notification Management Service—Functional Model", S6-221956, 3GPP TSG-SA WG6 Meeting #49-bis-e, Jun. 22-Jul. 1, 2022, 4 pages.
3GPP TR 23.700-98 V18.1.0, (Mar. 2023), 248 pp.
3GPP TS 24.545 V18.0.1, (Mar. 2023), 95 pp.
International Search Report dated Aug. 20, 2024 issued in counterpart application No. PCT/KR2024/006359, 8 pages.

* cited by examiner

*Primary Examiner* — Austin J Moreau
(74) *Attorney, Agent, or Firm* — The Farrell Law Firm, P.C.

(57) ABSTRACT

The disclosure relates to a 5G or 6G communication system for supporting a higher data transmission rate. Disclosed are methods and systems for handling PUSH notification messages in a service enabler architecture layer notification management (SNM) service. The method can be used to for a high-level procedure using a hypertext transport protocol (HTTP) to enable an SNM server (SNM-S) to push the notification messages to an SNM client (SNM-C).

18 Claims, 7 Drawing Sheets

METHODS AND SYSTEMS TO PUSH NOTIFICATION MESSAGES IN SEAL NOTIFICATION MANAGEMENT SERVICE

CROSS REFERENCE TO RELATED APPLICATION(S)

This application is based on and claims priority under 35 U.S.C. § 119 to Indian Provisional Patent Application Serial No. 202341033668, filed in the Indian Patent Office on May 12, 2023, Indian Provisional Patent Application Serial No. 202341033729, filed in the Indian Patent Office on May 12, 2023, and Indian Complete Patent Application Serial No. 202341033668, filed in the Indian Patent Office on Apr. 25, 2024, the entire content of each of which is incorporated herein by reference.

BACKGROUND

1. Field

The disclosure relates generally to notification methods and systems, and more particularly, to methods and systems for handling push notification messages in a service enabler architecture layer (SEAL) notification management service.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as an LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Currently, each application (e.g., chat, social media, or finance application) on a user equipment (UE) (e.g., smart phone or laptop) listens for notification messages from their respective servers called as vertical application layer (VAL) servers. This creates excessive traffic on a network, since each VAL server is deployed in different regions running on different Internet protocol (IP) addresses and ports. Due to continuous listening from the UE for notification, excessive computing resources and power are consumed by the UE.

SUMMARY

The disclosure has been made to address at least the above-mentioned problems and/or disadvantages and to provide at least the advantages described below.

Accordingly, an aspect of the disclosure is to provide methods and systems for handling PUSH notification messages in a SEAL notification management service.

An aspect of the disclosure is to provide a high-level procedure using a hypertext transfer protocol (HTTP) to enable the SNM-S to push the notification messages to an SNM-C.

An aspect of the disclosure is to provide a procedure for the SNM-C to receive the notification messages from the SNM-S over the notification channel and decoding the received notification messages.

An aspect of the disclosure is to provide a procedure for the SNM-S to encode the notification messages and push these notification messages to the SNM-C over the notification channel.

An aspect of the disclosure is to provide a message format to encode the notification messages that shall be pushed by the SNM-S to the SNM-C.

An aspect of the disclosure is to provide a generic notification payload format that shall store the messages received by different VAL servers, where in each notification messages are different since they are received from different VAL servers.

An aspect of the disclosure is to provide a method and apparatus for encoding and decoding of these notification payload and notification message format in an SNM service.

An aspect of the disclosure is to enable the SNM-C to share the PUSH callback-URL as part of CREATE notification channel procedure.

An aspect of the disclosure is to enable the SNM-S to manage and usage of the PUSH callback-URL for pushing future notification messages from SNM-S to SNM-C, on successful creation.

In accordance with an aspect of the disclosure, a method for managing a push notification message in a SEAL notification management (SNM) service includes receiving, by an SNM client (SNM-C), an HTTP POST request over a push callback URI from an SNM server (SNM-S), matching, by the SNM-C, an identifier (ID) received in a channel ID parameter associated with the HTTP POST request with a locally stored channel ID at the SNM-C, sending, by the SNM-C, an HTTP response to the SNM-S upon matching the ID received in the channel ID parameter associated with the HTTP POST request with the locally stored channel ID at the SNM-C, processing, by the SNM-C, a VAL notification message list parameter including at least one encoded VAL notification message received in an HTTP request entity-body of the HTTP POST request, and delivering, by the SNM-C, the push notification message received from the VAL notification message list parameter to a VAL client running on a UE.

In accordance with an aspect of the disclosure, a method for managing a push notification message in SNM service includes receiving, by an SNM server (SNM-S), a push notification message from a VAL server, determining, by the SNM-S, that a push notification channel exists with an SNM-C to receive the push notification message matching to a VAL ID shared by the VAL server, generating, by the SNM-S, an HTTP POST message, wherein an HTTP body is set with a VAL notification message payload that stores each push notification message received from the VAL server encoded in a VAL notification message form, and sending, by the SNM-S, the generated HTTP POST message to the SNM-C.

In accordance with an aspect of the disclosure, an SNM-C includes a processor, a memory, and a push notification message handling controller, coupled with the processor and the memory, configured to receive an HTTP POST request over a push callback URI from an SNM-S, match an ID received in a channel ID parameter associated with the HTTP POST request with a locally stored channel ID at the SNM-C, send an HTTP response to the SNM-S upon matching the ID received in the channel ID parameter associated with the HTTP POST request with the locally stored channel ID at the SNM-C, process a VAL notification message list parameter comprising decoding at least one encoded VAL notification message received in an HTTP request entity-body of the HTTP POST request, and deliver each push notification message received from the VAL notification message list parameter to a VAL client running on a UE.

In accordance with an aspect of the disclosure, an SNM-S includes a processor, a memory, and a push notification message handling controller, coupled with the processor and the memory, configured to receive a push notification message from a VAL server, determine that a push notification channel exists with a SEAL notification management client (SNM-C) to receive the push notification message matching to a VAL ID shared by the VAL server, generate an HTTP POST message having an HTTP body that is set with a VAL notification message payload that stores push notification messages received from the VAL server encoded in a VAL notification message form, and send the generated HTTP POST request to the SNM-C.

In accordance with an aspect of the disclosure, a method for managing and sharing a PUSH call-back URL in a SEAL notification management (SNM) service includes receiving, by an SNM client (SNM-C), a request from a VAL service to receive a PUSH notification message via a notification channel, sending, by the SNM-C, an HTTP POST request to an SNM server (SNM-S) based on the request received from the VAL service, creating, by the SNM-C, the PUSH notification channel with an associated PUSH callback URI based on the HTTP POST request, notifying, by the SNM-C, the VAL service about a successful reception of the PUSH notification message via the notification channel upon receiving an HTTP 200 OK response message from the SNM-S, and listening, by the SNM-C, to the PUSH callback URI for receiving a future PUSH notification message from the SNM-S.

In accordance with an aspect of the disclosure, a method for managing and sharing a push notification message in a SEAL notification management (SNM) service includes receiving, by an SNM server (SNM-S), an HTTP POST request for creating a notification channel request from an SNM client (SNM-C) in which a request-URL associated with the HTTP POST request comprises a URL of the SNM-S, processing, by the SNM-S, the create notification channel request upon determining that a channel type is a PUSH type and a requestor identity of the received HTTP POST request is an authorized requestor, processing, by the SNM-S, the PUSH channel details upon determining that a channel type is the PUSH type to fetch the PUSH callback-URI of the SNM-C, creating, by the SNM-S, a notification channel response message indicating a successful creation of the notification channel, sending, by the SNM-S, an HTTP OK response message comprising the notification channel response message to the SNM-C, and storing, by the SNM-S, the processed PUSH callback-URI of the SNM-C for future usages when the notification messages are to be pushed to the SNM-C, wherein the notification messages are be addressed to the PUSH callback-URI of the SNM-C.

In accordance with an aspect of the disclosure, a SEAL notification management server (SNM-S) includes a processor, a memory, and a push notification message handling controller, coupled with the processor and the memory, configured to receive an HTTP POST request for creating a notification channel request from a SEAL notification management Client (SNM-C) in which a request-URL associated with the HTTP POST request comprises a URL of the SNM-S, process the create notification channel request upon determining that a channel type is a PUSH type and a requestor identity of the received HTTP POST request is an authorized requestor, process the PUSH channel details upon determining that a channel type is the PUSH type to fetch the PUSH callback-URI of the SNM-C, create a notification channel response message indicating a successful creation of the notification channel, send an HTTP OK response message comprising the notification channel response message to the SNM-C, and store the processed PUSH callback-URI of the SNM-C for a future use when the notification messages are to be pushed to the SNM-C, wherein the notification messages are be addressed to the PUSH callback-URI of the SNM-C.

BRIEF DESCRIPTION OF THE DRAWINGS

The foregoing and other aspects, features, and advantages of embodiments herein will become more apparent from the following description with reference to the accompanying drawings, in which.

DETAILED DESCRIPTION

The following description with reference to the accompanying drawings is provided to assist in a comprehensive understanding of embodiments of the present disclosure. Accordingly, those of ordinary skill in the art will recognize that various changes and modifications of the embodiments described herein can be made without departing from the scope and spirit of the present disclosure. Descriptions of well-known functions and constructions may be omitted for the sake of clarity and conciseness.

Herein, the term "exemplary" is used to indicate "serving as an example, instance, or illustration." An embodiment or implementation of the subject matter described herein as "exemplary" is not necessarily to be construed as preferred or advantageous over other embodiments.

While the disclosure is applicable to various modifications and alternative forms, an embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the scope of the disclosure.

The terms "comprises", "comprising", or similar terms, are intended to cover a non-exclusive inclusion, such that a setup, device or method that comprises a list of components or steps does not include only those components or steps but may include other components or steps not expressly listed or inherent to such setup or device or method. One or more elements in a device or system or apparatus proceeded by "comprises . . . a" does not, without more constraints, preclude the existence of other elements or additional elements in the device or system or apparatus.

In the following detailed description, reference is made to the accompanying drawings of embodiments in which the disclosure may be practiced. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

The definitions (as defined herein) will apply and whenever appropriate the terms used in singular will also include the plural and vice versa.

The terminology used herein is for the purposes of describing particular embodiments only and is not intended to be limiting. The terms "comprising", "having" and "including" are to be construed as open-ended terms unless otherwise noted.

The words/phrases "example", "illustration", "in an instance", "and the like", "and so on", "etc.", "etcetera", "e.g.,", "i.e.," are merely used herein to indicate "serving as an example, instance, or illustration." Any embodiment or implementation of the present subject matter described herein using the words/phrases "example", "illustration", "in an instance", "and the like", "and so on", "etc.", "etcetera", "e.g.,", "i.e.," is not necessarily to be construed as preferred or advantageous over other embodiments.

Elements in the drawings are illustrated for the purposes of this description and ease of understanding and may not have necessarily been drawn to scale. For example, the flowcharts/sequence diagrams illustrate the method in terms of the steps required for understanding of aspects of the embodiments as disclosed herein. In terms of the construction of the device, one or more components of the device may have been represented in the drawings by conventional symbols, and the drawings may show only those specific details that are pertinent to understanding the present embodiments so as not to obscure the drawings with details that will be readily apparent to those of ordinary skill in the art having the benefit of the description herein. In terms of the system, one or more components/modules which comprise the system may have been represented in the drawings by conventional symbols, and the drawings may show only those specific details that are pertinent to understanding the embodiments so as not to obscure the drawings with details that will be readily apparent to those of ordinary skill in the art having the benefit of the description herein.

The accompanying drawings are used to help easily understand various technical features and the embodiments presented herein are not limited by the accompanying drawings. As such, the disclosure should be construed to extend to any modifications, equivalents, and substitutes in addition to those which are particularly set forth in the accompanying drawings and the corresponding description. Usage of words such as first, second, third etc., to describe components/elements/steps is for the purposes of this description and should not be construed as sequential ordering/placement/occurrence unless specified otherwise.

In a SEAL notification management service, third generation partnership project (3GPP) technical specification (TS) 24.542 defines a notification mechanism to be consumed by the applications running in the UE. A SEAL notification management client (SNM-C) sends a create notification channel request to a SEAL notification management server (SNM-S). When the processing is successful, the SNM-S sends response with callback associated with the SNM-S.

Currently, the specification defines procedures to provide a notification channel with callback associated with the SNM-S when the SNM-C creates the notification channel with the SNM-S. The applications residing in the UE can use the notification channel by sharing the callback associated with the SNM-S to their VAL servers for pushing future notification messages through the SNM-S. Thus, the SEAL notification management offloads the responsibility of notification management performed by each application residing on the UE and realizes same with simplified approach with just one or a few notification channels between the SNM-C and the SNM-S.

However, the specification for notification management has not defined any push message procedures if the SNM-S needs to push notification messages to the SNM-C over an active notification channel. Hence, the applications residing on the UE registered with the SNM-C shall not be able to receive any notifications from the SNM-S which has received messages from its VAL server
- whenever a new user is added to a messaging group or existing user is removed from the messaging group on a SEAL group server, or when a location server wants to notify change in location information to the UE.

The above are just two cases but this instance can be applicable any real time notifications.

In addition, 3GPP TS 24.542 for NM does not enable SNM-C to expose a PUSH callback-uniform resource locator (URL) as part of creation notification channel procedure. However, the SNM-C creates and maintains an active notification channel with the SNM-S, but SNM-S cannot PUSH any notification messages to the SNM-C since the SNM-C has not provided a PUSH callback-URL on which it listens to receive the notification messages pushed from the SNM-S. This defeats the main purpose of creating the PUSH notification channel.

Therefore, there is a need in the art for methods and systems for capably handling PUSH notification messages in a SEAL notification management service.

In 3GPP TS 24.542, there is no procedure currently defined for an SNM-S to PUSH notification messages addressed to an SNM-C. Hence, the disclosure provides new high-level procedures using an HTTP protocol with the proposed notification message payload, which enables the SNM-S to PUSH the notification messages to the SNM-C. The methods and systems can be used for handling PUSH notification messages in a SEAL notification management service.

The methods disclosed herein can be used to PUSH notification messages in a wireless network or a wired network. A new "extensible" information element is disclosed to represent an NM payload embedded with in an NM list. A new "encoding scheme" is disclosed and is to be included in a content-type header field of HTTP requests as defined "application/vnd.3gpp.seal-notification-payload/json".

The disclosed push notification procedure enables the SNM-S to easily PUSH notification messages to the SNM-C without excessive resource use.

Figure 1:
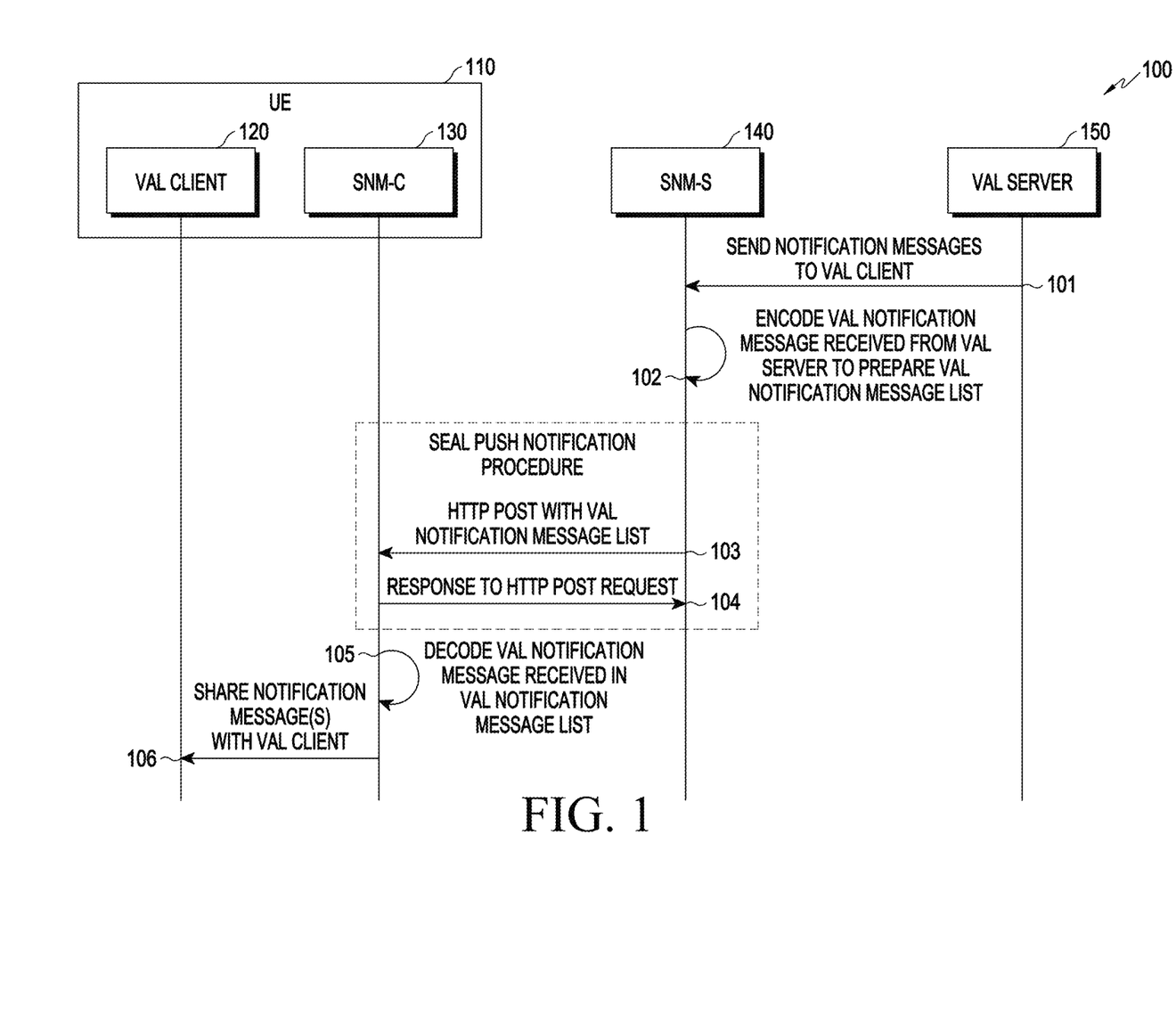
FIG. 1 illustrates a system for managing a push notification message in a SEAL notification management service, according to an embodiment.

FIG. 1 illustrates a system (100) for managing a push notification message in a SEAL notification management service, according to an embodiment.

In step 101, the SNM-S (140) receives notification messages to share with the VAL client (120) from the VAL server (150). In step 102, the SNM-S (140) encodes the VAL notification message(s) received from the VAL server (150) to prepare a VAL notification message list. In step 103, the SNM-S (140) sends an HTTP POST with the VAL notification message list to the SNM-C (130). In step 104, after receiving the HTTP POST with the VAL notification message list from the SNM-S (140), the SNM-C (130) sends a response to the HTTP POST request to the SNM-S (140). In step 105, the SNM-C (130) decodes the VAL notification message(s) received in the VAL notification message list. In step 106, the SNM-C (130) shares the NM(s) with the VAL client (120).

A method for the SNM-S (140) to encode the NM payload consisting of a list of notification messages sent in the HTTP request body towards the SNM-C (130) is disclosed. A method for the SNM-C (130) to decode the NM payload consisting of the list of notification messages received in the HTTP request body from the SNM-S (140) is disclosed.

Various procedures for managing the push notification message in the SEAL notification management service are explained below.

NM Delivery

Receiving PUSH notification messages procedure: Upon receiving the HTTP POST request over a PUSH callback-URL or a PUSH callback-uniform resource identifier (URI) which was given to the SNM-S (140) at the time of notification channel creation, the SNM-C (130):
- a) matches ID received in the channel ID parameter of the HTTP POST request with the locally stored channel ID. If channel ID is not matching, then:
  - a. sends an HTTP 406 (Not Acceptable) response to the SNM-S (140) and disregards the remaining steps (e.g., skip rest of the steps);
- b) sends an HTTP 200 (OK) response to the SNM-S (140); and
- c) processes the VAL notification message list parameter received in HTTP request entity-body as specified in Table 1 below and delivers each received notification message to the appropriate VAL client (120) on the UE (110) that matches the VAL ID cluster info parameter received with each message.

Sending PUSH notification messages procedure: To send the PUSH notification messages received from the VAL server (150) to the SNM-C (130), the SNM-S (140):

a) determines whether a PUSH notification channel exists with the SNM-C (130) to receive the NMs matching to the VAL identities (e.g., VAL UE or VAL user ID, VAL service ID, VAL application ID or the like) shared by the VAL server (150), if there is no channel created and disregards the remaining steps;
b) generates an HTTP POST message to send notification messages received from the VAL server (150). In the HTTP POST message:
   1) sets request URI to the PUSH callback-URL or the PUSH callback-URI received at the time of creating channel;
   2) sets Content-Type header to "application/vnd.3gpp.seal-notification-payload/json";
   3) generates the NM payload as specified in Table 1 below:
      i) sets the channel ID associated with the SNM-C (130);
      ii) generates the NM list for the messaged received from the VAL servers (150) as specified in Table 2 below; and
   4) includes an HTTP request entity-body with the parameters specified in Table 1 below serialized into a JavaScript™ object notation (JSON) structure as specified in Internet engineering task force request for comments (IETF RFC) 7159; and
c) sends the HTTP POST request towards the SNM-C (130).

The information in Tables 1, 2 and 3 below provides a normative description of the parameters which will be sent by the SNM-S (140) to the SNM-C (130), while sending notification messages over notification channel.

Server-side parameters: The SNM-S (140) conveys the following parameters in Tables 1, 2 and 3 while sending the NMs over the notification channel.

TABLE 1

Server-side parameters for notification message payload

| Parameter | Description |
|---|---|
| Channel ID | REQUIRED. Represents the ID of the notification channel corresponding to the SNM-C |
| VAL Notification Message List | REQUIRED. Represents a list of notification messages. Each notification message represents the message received from VAL servers which is encoded by SNM-S as specified in Table 2 |

TABLE 2

VAL Notification Message

| Parameter | Description |
|---|---|
| VAL Id Cluster Info | REQUIRED. Represents the VAL identities shared by VAL server along with the VAL notification message which is encoded as specified in Table 3. |
| VAL Notification Message Type | REQUIRED. Represents the content type of the VAL notification message as shared by the VAL server. |
| VAL Notification Message Length | REQUIRED. Represents the length of the VAL notification message. |
| VAL Notification Message | REQUIRED. Represents the message received from the VAL server to be notified to the SNM-C. |

TABLE 3

VAL Identity Cluster Info

| Parameter | Description |
|---|---|
| VAL User Identity | REQUIRED. Represents the identity of VAL user within the VAL service. |
| VAL Service ID | REQUIRED. Represents the Identify of the VAL service. |
| VAL Application ID | REQUIRED. Represents the Identity of the VAL application residing in the VAL UE. |

Figure 2:
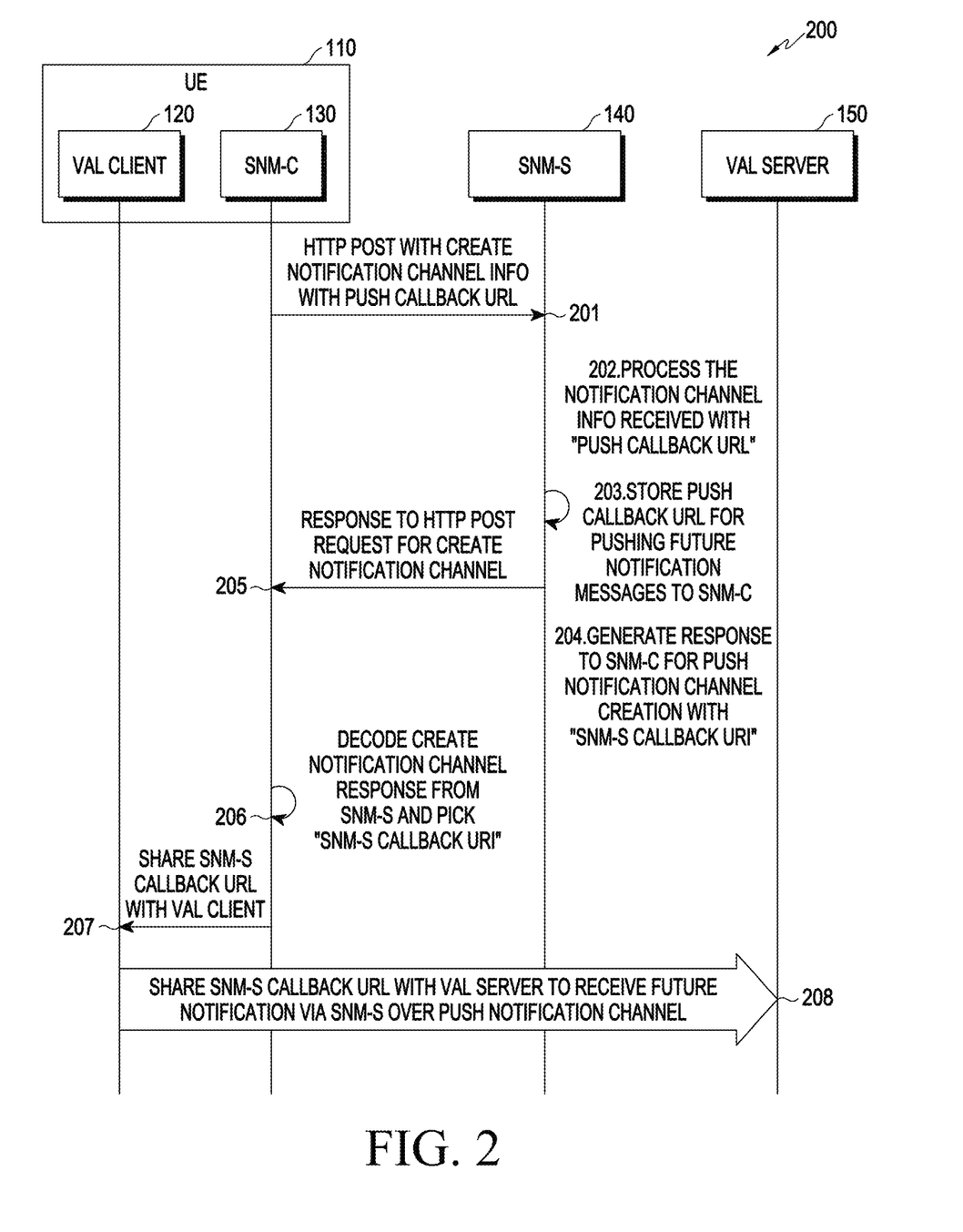
FIG. 2 illustrates a system for managing a PUSH callback-URL in an SNM service, according to an embodiment.

FIG. 2 illustrates a system (200) for managing a PUSH callback-URL in an SNM service, according to an embodiment.

The disclosure provides methods to enable the SNM-C (130) to share PUSH callback-URL for establishing PUSH notification channel with the SNM-S (140), provides an extensible information element to represent the PUSH channel details and PUSH callback-URL, provides a method for the SNM-C (130) to encode the PUSH callback-URL and embed it under PUSH channel details parameter sent as part of the create notification channel request sent towards the SNM-S (140), and provides a method for the SNM-S (140) to decode the PUSH callback-URL in the PUSH channel details parameter received as part of the create notification channel request body from the SNM-C (130).

Referring to FIG. 2, in step 201, the SNM-C (130) sends the HTTP POST with the create notification channel information with the PUSH Callback URL to the SNM-S (140). In step 202, the SNM-S (140) processes the notification channel information received with "PUSH Callback URL". In step 203, the SNM-S (140) stores the PUSH callback URL for PUSHING future NMs to the SNM-C (130). In step 204, the SNM-S (140) generates the response to the SNM-C (130) for PUSH notification channel creation with "SNM-S callback URL" (see Table 7 below). In step 205, the SNM-S (140) sends the response to HTTP POST request for create notification channel to the SNM-C (130). In step 206, SNM-C (130) decodes the create notification channel response from the SNM-S (140) and picks "SNM-S callback URL". In step 207, SNM-C (130) shares the SNM-S callback URL with the VAL client (120). In step 208, the VAL client (120) shares the SNM-S callback URL with the VAL server (150) to receive future notification via the SNM-S (140) over the PUSH notification channel.

Notification Channel Creation Procedure:

SNM client procedures: Upon receiving the request from the VAL service to receive notifications via the notification channel, the SNM-C (130) may create the notification channel by sending the HTTP POST request to the SNM-S (140). In the HTTP POST request, the SNM-C (130):
   a) sets the Request-URI to the URI of the SNM-S (140);
   b) includes the Host header with public user identity of SNM-S (140);
   c) includes an Authorization header field with the "Bearer" authentication scheme set to an access token of the "bearer" token type as specified in IETF RFC 6750;
   d) includes a Content-Type header field set to "application/vnd.3gpp.seal-create-notification-channel-request";
   e) generates the create notification channel request message as specified in Table 4 below:
      1) sets the requestor identity to the notification management client identity;

2) sets the channel type to PULL or PUSH based on the VAL application requesting the use of notification channel;
3) sets the PUSH channel details parameter with the PUSH callback-URL if the channel type is PUSH; and
4) sets the validity duration of the notification channel;
5) sets the VAL ID cluster list parameter with list of VAL identities corresponding to each VAL service requesting to receive notifications via the notification channel; and
f) includes the parameters specified in Table 4 below serialized into the JSON structure as specified in IETF RFC 7159.

Upon receiving an HTTP 200 (OK), the SNM-C (130) notifies the VAL services about the successful creation of notification channel and listens on the PUSH callback-URL for receiving the PUSH NMs from the SNM-S (140).

SNM server procedures: Upon reception of an HTTP POST request from SNM-C (130) where the request-URI of the HTTP POST request contains the URI of the SNM-S (140), the SNM-S (140):
  a) determines the requestor identity of the received HTTP POST request as specified above, and:
    1) if the identity of the sender of the received HTTP POST request is not authorized user, responds with an HTTP 403 (Forbidden) response to the HTTP POST request and disregards the remaining steps;
  b) processes the create notification channel request and if the channel type is:
    1) PUSH, the SNM-S (140) processes:
      i) the PUSH channel details parameter to fetch the PUSH callback-URL of the SNM-C (130):
        A) if the PUSH callback-URL is not provided the SNM-S (140) shall respond with an HTTP 406 (Not Acceptable) response to the HTTP POST request and disregards the remaining steps;
        B) the SNM-S (140) stores this PUSH callback-URL for future usages, when the NMs are to be pushed to SNM-C (130).
      ii) the VAL ID cluster list parameter, which is a list of VAL identities corresponding to each VAL services requesting to receive notifications messages via the notification channel
    2) PULL, the SNM-S (140) waits for the SNM-C (130) to pull the NMs;
  c) processes the validity duration share by the SNM-C (130).

NOTE: The SNM-S (140) stores the of the authorized user and information shared as part of create notification channel request for future references, Upon successful creation of notification channel; the SGM-S:
  a) creates a notification channel response message with below attributes as specified in Table 7 (refer 3GPP TS 24.542);
    1) generates unique channel ID;
    2) generates the callback URL (e.g., SNM-S callback URL), which shall be used by VAL clients in UE for sharing it to VAL Server as part of their respective services;
    3) generates the validity duration of the notification channel;
    4) generates a notification URL that shall be used by the SNM-C (130) to pull the notifications from the SNM-S (140) in case of PULL channel type;
  b) includes a Content-Type header field set to "application/vnd.3gpp.seal-create-notification-channel-response"; and
  c) sends an HTTP 200 (OK) response including message generated above.

Client side parameters: The SNM-C (130) conveys the following parameters while sending request for create notification channel request. Table 4 below shows the Client side parameters for the create notification channel request.

TABLE 4

Client side parameters

| Parameter | Description |
| --- | --- |
| Requestor ID | REQUIRED. Represents the identity of the notification management client |
| Channel type | REQUIRED. Represents PULL or PUSH method to be used for delivering the NMs<br>0x01: PUSH TYPE<br>0x02: PULL TYPE |
| PUSH channel details | OPTIONAL. Represents details of the type of PUSH delivery and its associated data as specified in Table 5 below |
| Expiry Time | REQUIRED. Represents the duration the notification channel shall be active (i.e. channel lifetime) as requested by the notification management client |
| VAL Id Cluster List | REQUIRED. Represents the list of VAL identities corresponding to the VAL services as specified in Table 6 below. |

TABLE 5

PUSH channel details information

| Parameter | Description |
| --- | --- |
| PUSH Callback-URL | REQUIRED. Represents PUSH call back URL where the SNM-S shall push the NMs received by the VAL server |

TABLE 6

VAL ID cluster information

| Parameter | Description |
| --- | --- |
| VAL User ID | REQUIRED. Represents the identity of VAL user within the VAL service. |
| VAL Service ID | REQUIRED. Represents the Identify of the VAL service. |
| VAL Application ID | REQUIRED. Represents the Identity of the VAL application residing in the VAL UE. |

TABLE 7

PUSH notification channel creation

| Parameter | Description |
| --- | --- |
| Notification URL | OPTIONAL. Represents the URL that shall be used by SNM-C to pull notification if the channel type is PULL. |
| Callback URL | REQUIRED. Represents the URL, which shall be notified to VAL client by SNM-C. Further this URL shall be shared by VAL client to VAL server while subscribing for a VAL services. |
| Channel ID | REQUIRED. Represents the ID of the newly created notification channel. |
| Pull NM Trigger | OPTIONAL. Represents the application trigger for pulling NMs. When set to "true", it indicates the SNM-S is capable to send application trigger to SNM-C to initiate pull NM procedure. Set to "false" or omitted otherwise. |
| Expiry Time | OPTIONAL. Represents the duration the notification channel shall be active (i.e. channel lifetime) as requested by the notification management client. |

NOTE:
This attribute may be provided for PULL notification channel type.

Figure 3:
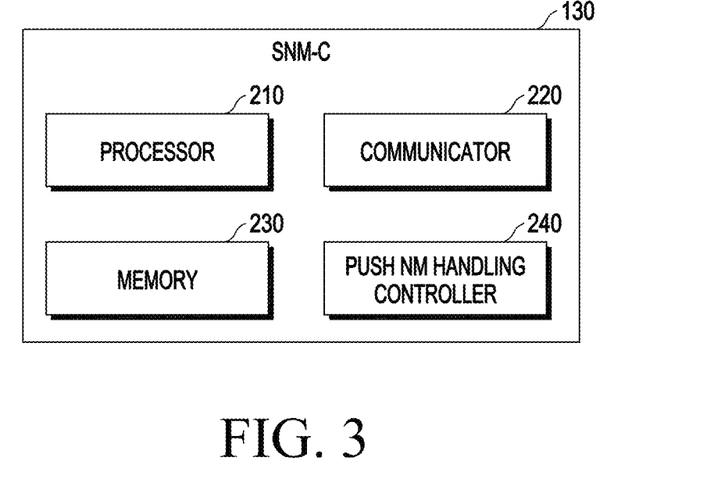
FIG. 3 illustrates hardware components of an SNM-C, according to an embodiment.

FIG. 3 illustrates hardware components of the SNM-C (130), according to an embodiment. Referring to FIG. 3, the SNM-C (130) includes a processor (210), a communicator (220), a memory (230) and a push NM handling controller (240). The processor (210) is coupled with the communicator (220), the memory (230) and the push NM handling controller (240).

The push NM handling controller (240) matches the ID received in the channel ID parameter associated with the HTTP POST request with the locally stored channel ID at the SNM-C (130) upon receiving the HTTP POST request over the push callback URL from the SNM-S (140). The push callback URL was shared to the SNM-S (140) at the time of notification channel creation.

The push NM handling controller (240) sends the HTTP response to the SNM-S (140) upon matching the ID received in the channel ID parameter associated with the HTTP POST request with the locally stored channel ID at the SNM-C (130).

The push NM handling controller (240) processes the VAL NM list parameter including the encoded VAL NM received in the HTTP request entity-body of the HTTP POST request. The VAL NM list parameter includes at least one of the channel ID and the VAL NM list. The channel ID is the ID of the notification channel corresponding to the SNM-C (130). The VAL NM list includes the list of NMs. Each NM from the list of NMs represents the message received from the VAL server (150) and encoded by the SNM-S (140).

The push NM handling controller (240) delivers each push NM received from the VAL NM list parameter to the respective VAL client (120) running on the UE (110). A decoded form of the push NM is delivered to the VAL client (120) running on the UE (110) whose VAL identities matches with the VAL ID cluster information parameter associated with the push NM.

The push NM is managed during PUSH notification channel procedure as part of seal notification management service. The push NM includes at least one of: the VAL ID cluster information, the VAL NM type, the VAL NM length, and the VAL NM. The VAL identity cluster information includes VAL identities shared by the VAL server (150) along with the VAL NM and modified by the SNM-S (140). The VAL NM type includes a content type of the VAL NM as shared by the VAL server (150). The VAL NM length includes a length of the VAL NM. The VAL NM includes the message received from the VAL server (150) to be notified to the VAL client (120) via SEAL notification channel.

The push NM handling controller (240) sends the suitable HTTP response in response to determining the matching channel ID is found or not.

The push NM handling controller (240) sends the HTTP POST request to the SNM-S (140) upon receiving the request from the VAL service to receive the PUSH NM via the notification channel. The push NM handling controller (240) sends the HTTP POST request to the SNM-S (140) to create the PUSH notification channel with the associated PUSH callback URL. The push NM handling controller (240) notifies the VAL service about the successful indication to receive the PUSH NM via the notification channel upon receiving the HTTP 200 OK message from the SNM-S (140). The push NM handling controller (240) listens the PUSH callback URL for receiving the future PUSH NM from the SNM-S (140).

The push NM handling controller (240) generates the notification channel request message. The notification channel request message is generated by setting the requestor identity to the notification management client identity, setting a channel type to the PULL type or the PUSH type based on the VAL application requesting the use of the notification channel, setting the PUSH channel details parameter with the PUSH callback-URL if the channel type is the PUSH type, setting the validity duration of the notification channel, and setting the VAL ID cluster list parameter with the list of VAL identities corresponding to each VAL service requesting to receive notifications via the notification channel.

The push NM handling controller (240) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (210) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (210) may include multiple cores and is configured to execute the instructions stored in the memory (230).

The processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although FIG. 3 illustrates hardware components of the SNM-C (130) but it is to be understood that other embodiments are not limited thereon. In other embodiments, the SNM-C (130) may include less or more number of components. The labels or names of the components are used only for illustrative purposes and does not limit the scope of the invention. One or more components can be combined together to perform the same or substantially similar function in the SNM-C (130).

Figure 4:
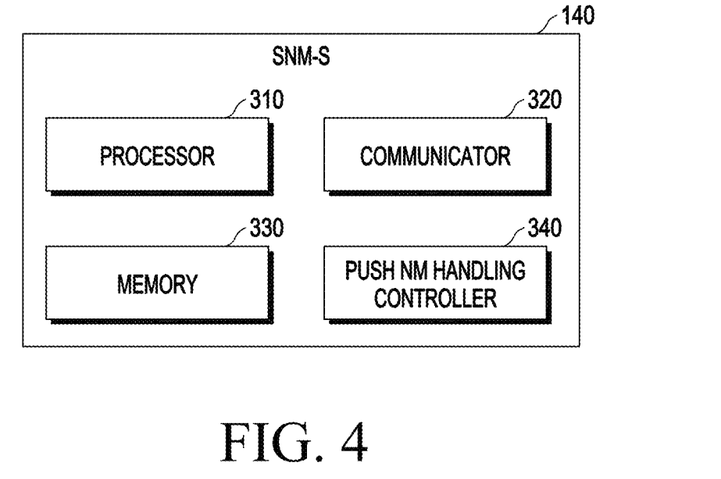
FIG. 4 illustrates hardware components of an SNM-S, according to an embodiment.

FIG. 4 illustrates hardware components of the SNM-S (140), according to an embodiment. The SNM-S (140) includes a processor (310), a communicator (320), a memory (330) and a push NM handling controller (340). The processor (310) is coupled with the communicator (320), the memory (330) and the push NM handling controller (340).

The push NM handling controller (340) receives the push NM from the VAL server (150). The push NM is managed during the seal notification management service. The push NM includes at least one of: the VAL ID cluster information, the VAL NM type, the VAL NM length, and the VAL NM. The VAL ID cluster information includes the VAL identity shared by the VAL server (150) along with the VAL NM. The VAL NM type includes a content type of the VAL NM as shared by the VAL server (150). The VAL NM length includes a length of the VAL NM. The VAL NM includes the message received from the VAL server (150) to be notified to the VAL Client (120) via SEAL notification channel.

The push NM handling controller (340) determines that the push notification channel exists with the SNM-C (130) to receive the push NM matching to the VAL identity shared by the VAL server (150). The VAL identity includes the VAL UE, the VAL user ID, the VAL service ID, and the VAL application ID.

The push NM handling controller (340) generates the HTTP POST message. The HTTP body is set with VAL NM payload that stores each the push NMs received from the VAL server (150) encoded in the VAL NM form. The HTTP POST message is configured to set a request URI to a PUSH callback-URL received at the time of creating the notification channel. The HTTP POST message is configured to set a content-type header to an application/vnd.3gpp.seal-notification-payload/json. The HTTP POST message is configured to set the NM payload as specified in a VAL NM list parameter. The VAL NM list parameter includes at least one of a channel ID associated with the SNM-C (130) and the VAL NM list for the message received from the VAL server (150). The VAL NM list parameter included in the HTTP request entity-body as specified in clause Table 1 above and serialized into the JSON structure as specified in IETF RFC 7159.

The VAL NM list includes a list of NMs. Each NM from the list of NMs represents the message received from a same or different VAL server (150). The NM is encoded by the SNM-S (140). When the SNM-S (140) decided to perform PUSH notification messages to the particular SNM-C, the SNM-S (140) determines all the NMs addressed to the SNM-C (130) received irrespective from which VAL server (150).

The push notification message handling controller (340) sends the generated HTTP post request to the SNM-C (130).

Alternatively, the push notification message handling controller (340) receives the HTTP POST request for creating the notification channel request from the SNM-C (130) in which the request-URI associated with the HTTP POST request includes the URI of the SNM-S (140). The push notification message handling controller (340) processes the create notification channel request upon determining that the channel type is the PUSH type and the requestor identity of the received HTTP POST request is the authorized requestor. The push notification message handling controller (340) processes the PUSH channel details upon determining that the channel type is the PUSH type to fetch the PUSH callback-URL of the SNM-C (130). The push notification message handling controller (340) creates the notification channel response message indicating successful creation of the notification channel and sends the HTTP 200 OK response message including the notification channel response message to the SNM-C (130). The push notification message handling controller (340) stores the processed PUSH callback-URL of the SNM-C (130) for future usages, when the NMs are to be pushed to the SNM-C (130).

The push notification message handling controller (340) creates the HTTP POST request with request URI set to PUSH callback-URL of the SNM-C (130) and sends the request towards the SNM-C (130) to push the NM addressed to the SNM-C (130).

Although FIG. 4 illustrates hardware components of the SNM-S (140), it is to be understood that the disclosure is not limited thereto. In other embodiments, the SNM-S (140) may include fewer or more components. The labels or names of the components are used only for illustrative purposes and do not limit the scope of the disclosure. One or more components can be combined together to perform the same or substantially similar function in the SNM-S (140).

Figure 5:
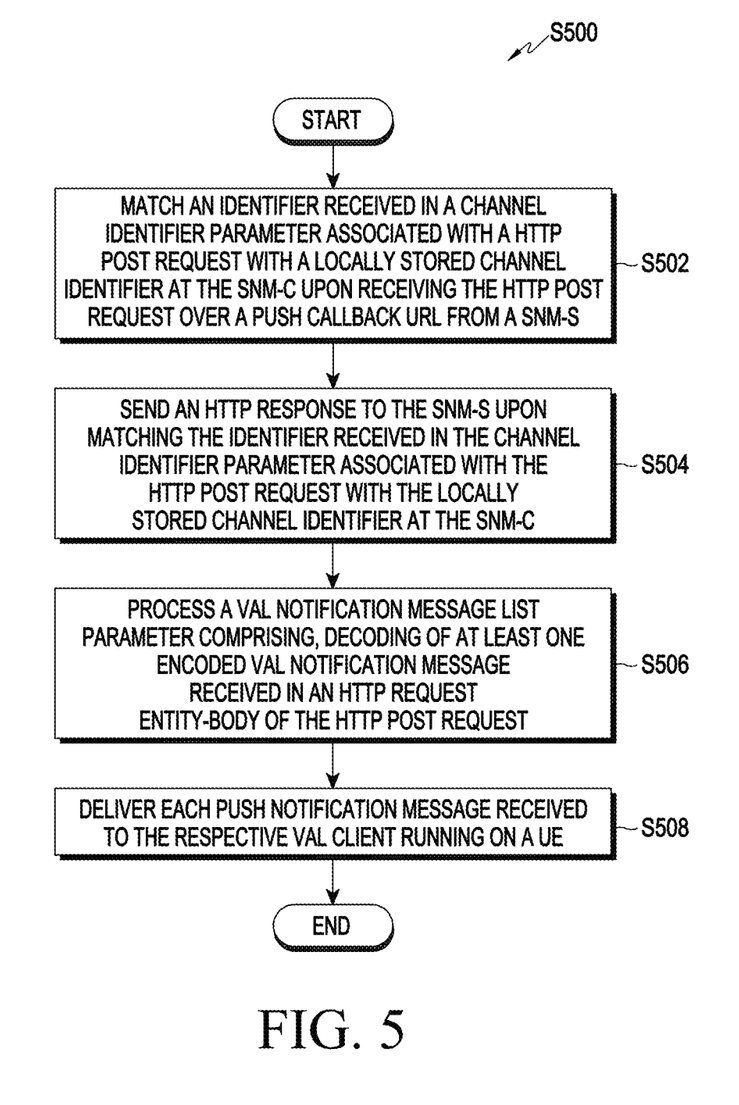
FIG. 5 illustrates a method, implemented by the SNM-C, for managing a push notification message in the SEAL notification management service, according to an embodiment.

FIG. 5 illustrates a method (S500), implemented by the SNM-C (130), for managing the push notification message in the SEAL notification management service, according to an embodiment. The steps (S502-S508) are performed by the push NM handling controller (240).

In step S502, the push NM handling controller (240) matches the ID received in the channel ID parameter associated with the HTTP POST request with the locally stored channel ID at the SNM-C (130) upon receiving the HTTP POST request over the push callback URL from the SNM-S (140). In step S504, the push NM handling controller (240) sends the HTTP response to the SNM-S (140) upon matching the ID received in the channel ID parameter associated with the HTTP POST request with the locally stored channel ID at the SNM-C (130). In step S506, the push NM handling controller (240) processes the VAL NM list parameter including decoding of the at least one encoded VAL NM received in the HTTP request entity-body of the HTTP POST request. In step S508, the push NM handling controller (240) delivers the push NM received to the VAL client (120) running on the UE (110).

Figure 6:
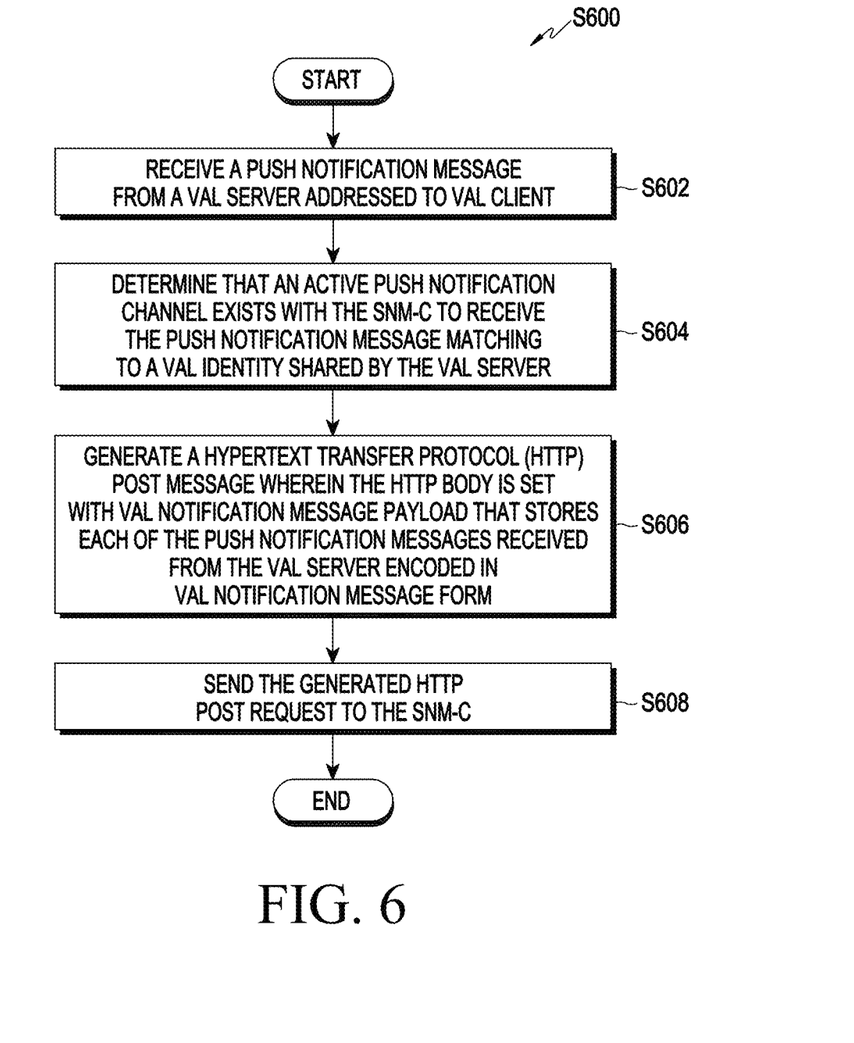
FIG. 6 illustrates a method, implemented by the SNM-S, for managing the push notification message in the SEAL notification management service, according to an embodiment.

FIG. 6 illustrates a method (S600), implemented by the SNM-S (140), for managing the push NM in the SEAL notification management service, according to an embodiment. Steps (S602-S608) are performed by the push NM handling controller (340).

In step S602, the push NM handling controller (340) receives the push NMs from the VAL server (150) addressed to VAL client. In step S604, the push NM handling controller (340) determines that the active push notification channel exists with the SNM-C (130) to receive the push NM matching to the VAL identity shared by the VAL server (150). In step S606, the push NM handling controller (340) generates the HTTP POST message. The HTTP body is set with VAL NM payload that stores each the push NMs received from the VAL server (150) encoded in a VAL NM form. In step S608, the push NM handling controller (340) sends the generated HTTP POST message to the SNM-C (130).

The disclosed PUSH notification procedure enables the SNM-S (140) to easily PUSH the NMs to SNM-C (130) without consuming excessive resources.

Figure 7:
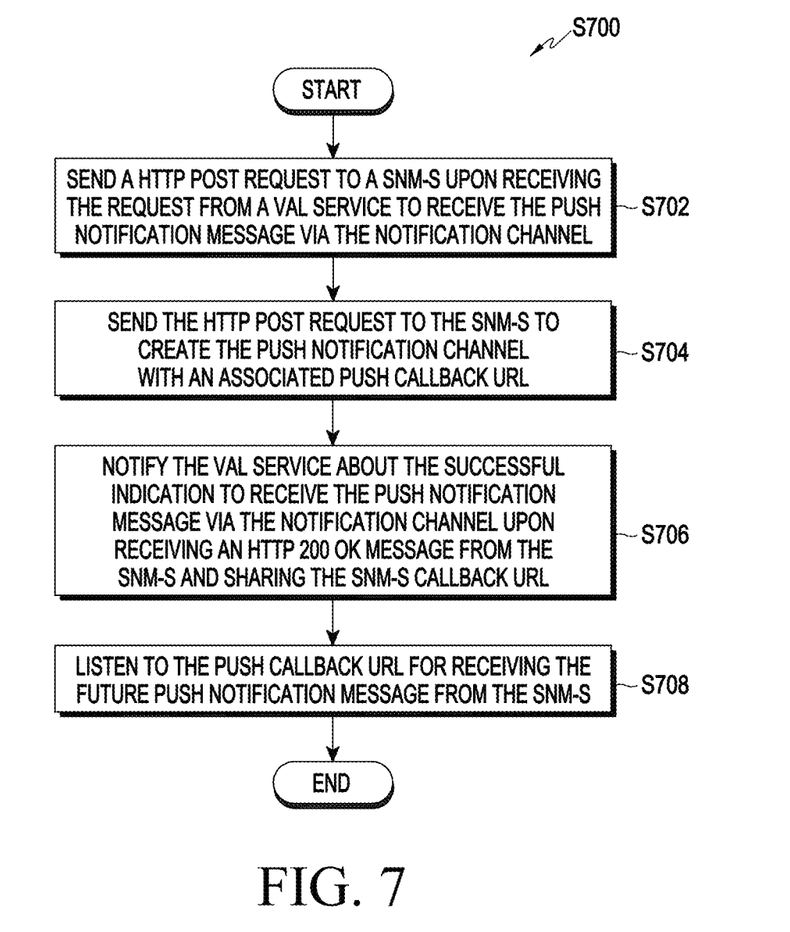
FIG. 7 illustrates a method, implemented by the SNM-C, for managing the PUSH callback-URL notification message in the SEAL notification management service during create notification channel procedure invocation, according to an embodiment.

FIG. 7 illustrates a method (S700), implemented by the SNM-C (130), for managing the PUSH callback-URL NM in the SEAL notification management service during create notification channel procedure invocation, according to an embodiment. Steps S702-S708 are performed by the push NM handling controller (240).

In step S702, the push NM handling controller (240) sends the HTTP POST request to the SNM-S (140) upon receiving the request from the VAL service to receive the PUSH NM via the notification channel. In step S704, the push NM handling controller (240) sends the HTTP POST request to the SNM-S (140) to create the PUSH notification channel with the associated PUSH callback URL. In step S706, the push NM handling controller (240) notifies the VAL service about the successful indication to receive the PUSH NM via the notification channel upon receiving the HTTP 200 OK message from the SNM-S (140) and sharing the SNM-S callback URL. In step S708, the push NM handling controller (240) listens to the PUSH callback URL for receiving the future PUSH NM from the SNM-S (140).

Figure 8:
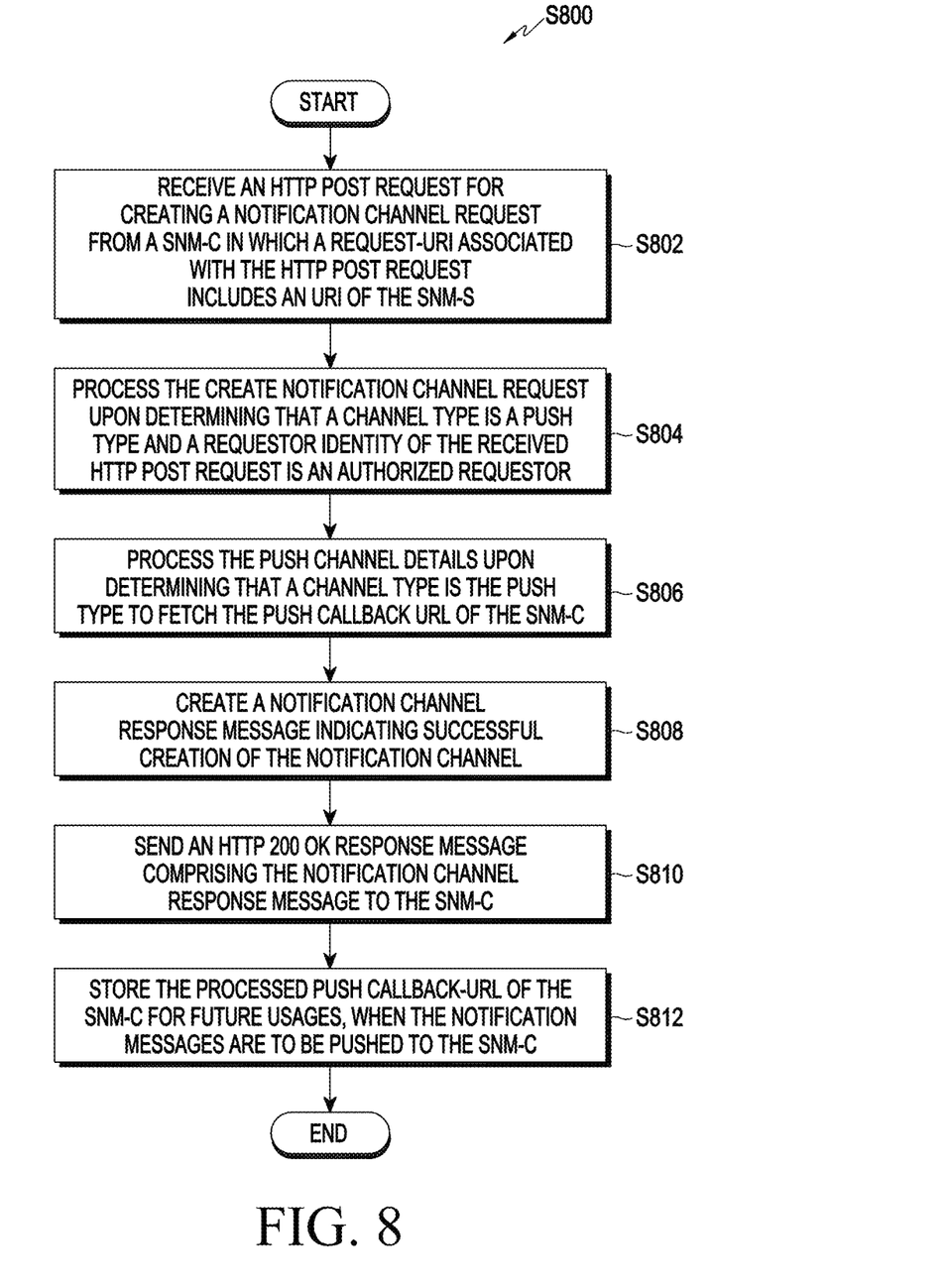
FIG. 8 illustrates a method, implemented by the SNM-S, for managing the PUSH callback-URL in the SEAL notification management service during create notification channel procedure invocation, according to an embodiment.

FIG. 8 illustrates a method (S800), implemented by the SNM-S (140), for managing the push callback-URL in the SEAL notification management service during create notification channel procedure invocation, according to an embodiment. Steps S802-S812 are performed by the push NM handling controller (340).

In step S802, the push NM handling controller (340) receives the HTTP POST request for creating the notification channel request from the SNM-C (130) in which the request-URI associated with the HTTP POST request includes the URI of the SNM-S (140). In step S804, the push NM handling controller (340) processes the create notification channel request upon determining that the channel type is the PUSH type and the requestor identity of the received HTTP POST request is the authorized requestor. In step S806, the push NM handling controller (340) processes the PUSH channel details upon determining that the channel type is the PUSH type to fetch the PUSH callback-URL of the SNM-C (130). In step S808, the push NM handling controller (340) creates the notification channel response message indicating successful creation of the notification channel. In step S810, the push NM handling controller (340) sending the HTTP 200 OK response message including the notification channel response message to the SNM-C (130). In step S812, the push NM handling controller (340) stores the processed PUSH callback-URL of the SNM-C (130) for future usages, when the NMs are to be pushed to the SNM-C (130).

Referring back to FIG. 4, the push NM handling controller (340) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (310) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (310) may include multiple cores and is configured to execute the instructions stored in the memory (330).

The processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in a random access memory (RAM) or cache).

Embodiments herein may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The various actions, acts, blocks, steps, or the like in the flow charts (disclosed herein S500-S800) may be performed in the order presented, in a different order or simultaneously. Some of the actions, acts, blocks, steps, or the like may be omitted, added, modified, skipped, or the like without departing from the scope of the disclosure.

The embodiments disclosed herein can be implemented through at least one software program running on at least one hardware device and performing network management functions to control the elements.

While the disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method for managing a push notification message in a service enabler architecture layer notification management (SNM) service, comprising:
   receiving, by an SNM client (SNM-C), a hypertext transfer protocol (HTTP) POST request over a push callback uniform resource identifier (URI) from an SNM server (SNM-S);
   matching, by the SNM-C, an identifier (ID) received in a channel ID parameter associated with the HTTP POST request with a locally stored channel ID at the SNM-C;
   sending, by the SNM-C, an HTTP response to the SNM-S upon matching the ID received in the channel ID parameter associated with the HTTP POST request with the locally stored channel ID at the SNM-C;
   processing, by the SNM-C, a vertical application layer (VAL) notification message list parameter including at least one encoded VAL notification message received in an HTTP request entity-body of the HTTP POST request; and
   delivering, by the SNM-C, the push notification message received from the VAL notification message list parameter to a VAL client running on a user equipment (UE).

2. The method of claim 1, wherein a decoded form of the push notification message is delivered to the VAL client running on the UE having VAL IDs match with a VAL ID cluster information parameter associated with the push notification message.

3. The method of claim 1, wherein the VAL notification message list parameter further includes at least one of a channel ID and a VAL notification message list.

4. The method of claim 3, wherein the channel ID is an ID of a notification channel corresponding to the SNM-C.

5. The method of claim 3, wherein the VAL notification message list comprises a list of notification messages, and
   wherein each of the notification messages represents a message received from a VAL server, is the message being encoded and pushed by the SNM-S.

6. The method of claim 1, wherein the push notification message is managed with a seal notification management service, and
   wherein each push notification message comprises at least one of VAL ID cluster information, a VAL notification message type, a VAL notification message length, and a VAL notification message.

7. The method of claim 6, wherein the VAL identity cluster information comprises VAL IDs shared by the VAL server along with the VAL notification message,
   wherein the VAL notification message type comprises a content type of the VAL notification message as shared by the VAL server,
   wherein the VAL notification message length comprises a length of the VAL notification message, and
   wherein the VAL notification message comprises the message received from the VAL server to be notified to the VAL client via a service enabler architecture layer (SEAL) notification channel.

8. A method for managing a push notification message in a service enabler architecture layer notification management (SNM) service, comprising:
   receiving, by an SNM server (SNM-S), the push notification message from a vertical application layer (VAL) server;
   determining, by the SNM-S, that a push notification channel exists with an SNM client (SNM-C) to receive the push notification message matching to a VAL identifier (ID) shared by the VAL server;
   generating, by the SNM-S, a hypertext transfer protocol (HTTP) POST message, wherein an HTTP body is set with a VAL notification message payload that stores each push notification message received from the VAL server encoded in a VAL notification message form; and
   sending, by the SNM-S, the generated HTTP POST message to the SNM-C.

9. The method of claim 8, wherein the VAL identity comprises at least one of a VAL user equipment, a VAL user ID, a VAL service ID, and a VAL application ID.

10. The method of claim 8, wherein the SNM-S creates the HTTP POST message with the request URI set to a PUSH callback-uniform resource identifier (URI) received at a time of creating the notification channel,
    wherein the HTTP POST message is set with a content-type header to an application/vnd.3gpp.seal-notification-payload/json message, and
    wherein the SNM-S message generates a notification message payload as specified in a VAL notification message list parameter.

11. The method of claim 10, wherein the VAL notification message list parameter comprises at least one of a channel ID associated with the SNM-C and a VAL notification message list for the message received from the VAL server.

12. The method of claim 11, wherein the channel ID is an ID of a notification channel corresponding to the SNM-C.

13. The method of claim 11, wherein the VAL notification message list comprises a list of notification messages, wherein each notification message from the list of notification messages represents the message received from a same or different VAL server, wherein the notification message is encoded by the SNM-S, wherein when the SNM-S decided to perform PUSH notification messages to a particular SNM-C, the SNM-S determines all the notification messages addressed to the SNM-C received irrespective from which VAL server.

14. The method of claim 10, wherein the VAL notification message list parameter provided as part of the HTTP request entity-body is represented in the JavaScript Object Notation (JSON) structure as specified in IETF RFC 7159.

15. The method of claim 8, wherein the push notification message is managed with in seal notification management service, wherein the push notification message comprises at least one of: a VAL ID cluster information, a VAL notification message type, a VAL notification message length, and a VAL notification message.

16. The method of claim 15, wherein the VAL ID cluster information comprises a VAL identity shared by the VAL server along with the VAL notification message, wherein the VAL notification message type comprises a content type of the VAL notification message as shared by the VAL server, wherein the VAL notification message length comprises a length of the VAL notification message, and wherein the VAL notification message comprises the message received from the VAL server to be notified to the VAL client via a service enabler architecture layer notification channel.

17. A service enabler architecture layer notification management client (SNM-C), comprising:
- a processor;
- a memory; and
- a push notification message handling controller, coupled with the processor and the memory, configured to:
  - receive a hypertext transfer protocol (HTTP) POST request over a push callback uniform resource identifier (URI) from an SNM server (SNM-S),
  - match an identifier (ID) received in a channel ID parameter associated with the HTTP POST request with a locally stored channel ID at the SNM-C,
  - send an HTTP response to the SNM-S upon matching the ID received in the channel ID parameter associated with the HTTP POST request with the locally stored channel ID at the SNM-C,
  - process a vertical application layer (VAL) notification message list parameter comprising decoding at least one encoded VAL notification message received in an HTTP request entity-body of the HTTP POST request, and
  - deliver each push notification message received from the VAL notification message list parameter to a VAL client running on a user equipment (UE).

18. A service enabler architecture layer notification management server (SNM-S), comprising:
- a processor;
- a memory; and
- a push notification message handling controller, coupled with the processor and the memory, configured to:
  - receive a push notification message from a vertical application layer (VAL) server,
  - determine that a push notification channel exists with a service enabler architecture layer notification management client (SNM-C) to receive the push notification message matching to a VAL identifier (ID) shared by the VAL server,
  - generate a hypertext transfer protocol (HTTP) POST message having an HTTP body that is set with a VAL notification message payload that stores push notification messages received from the VAL server encoded in a VAL notification message form, and
  - send the generated HTTP POST request to the SNM-C.

* * * * *